Nov. 22, 1938.  J. F. CAVANAGH  2,137,642
FASTENER-APPLYING IMPLEMENT
Filed May 24, 1937    4 Sheets-Sheet 1

Inventor:
John F. Cavanagh
By
Attorneys.

Nov. 22, 1938.  J. F. CAVANAGH  2,137,642
FASTENER-APPLYING IMPLEMENT
Filed May 24, 1937  4 Sheets-Sheet 2
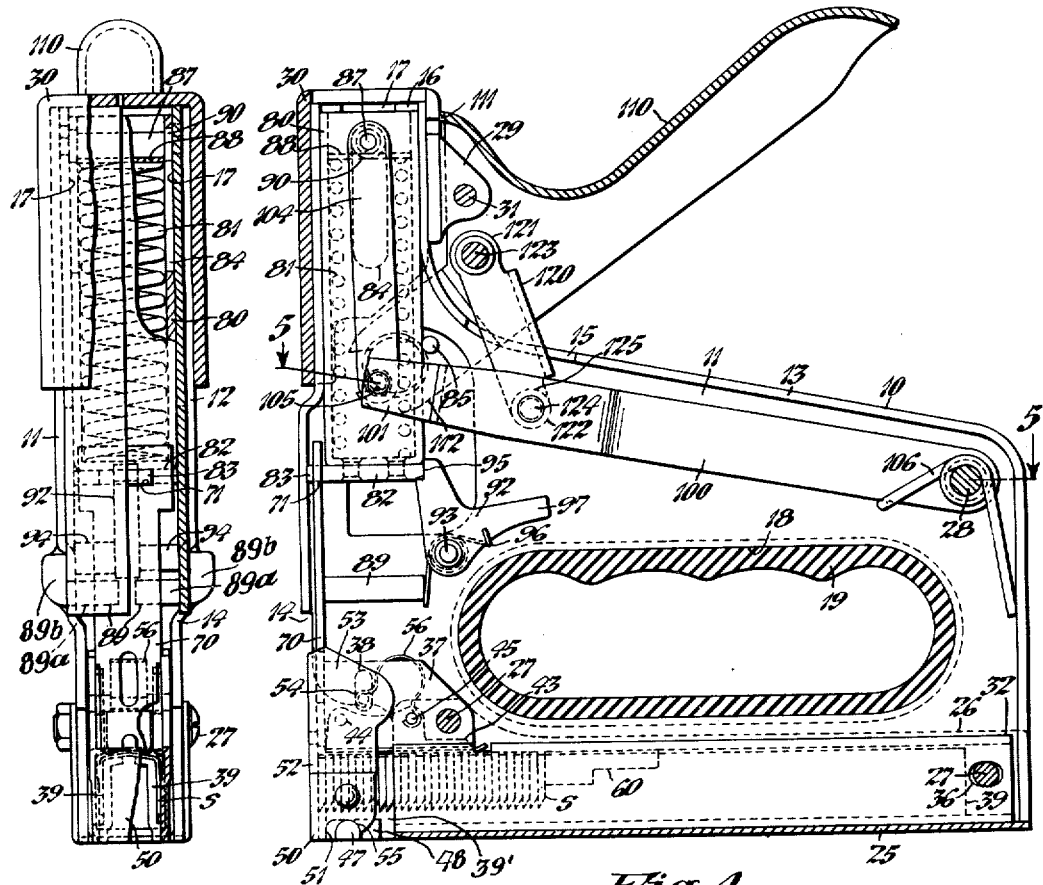
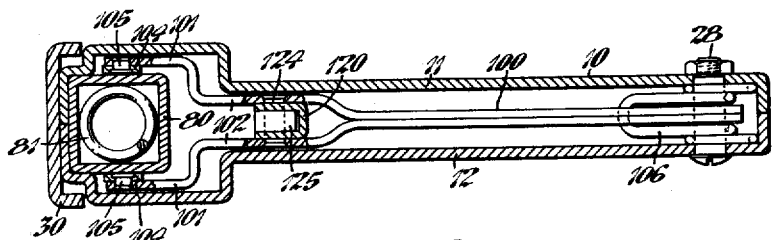
Inventor:
John F. Cavanagh
By *Pennington White*
Attorneys.

Nov. 22, 1938.  J. F. CAVANAGH  2,137,642
FASTENER-APPLYING IMPLEMENT
Filed May 24, 1937  4 Sheets-Sheet 3
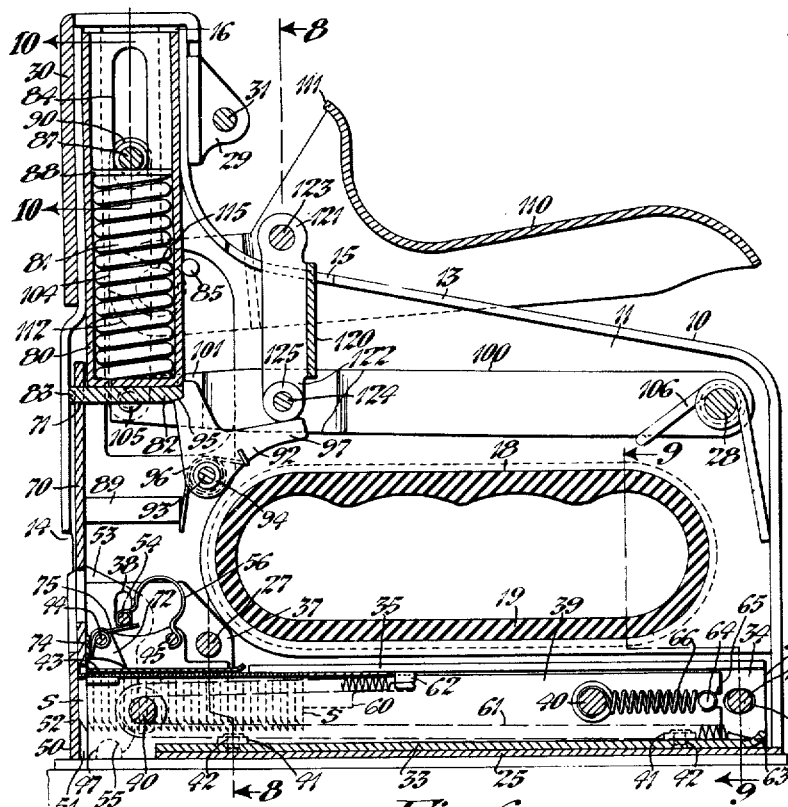
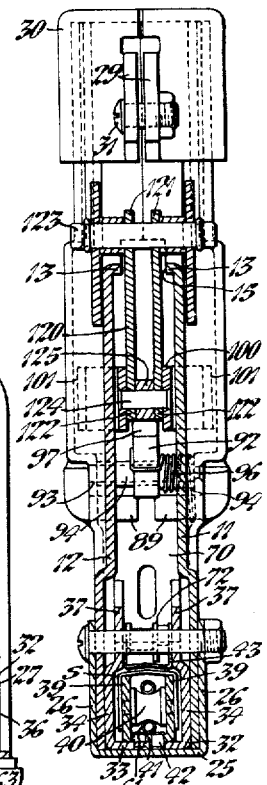
Fig. 6.  Fig. 8.
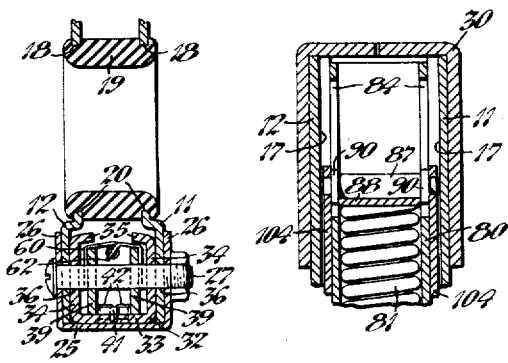
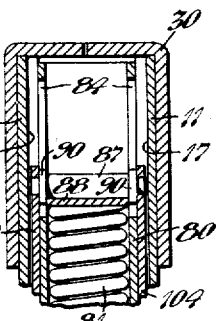
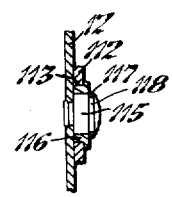
Fig. 9.  Fig. 10.  Fig. 11.
Inventor:
John F. Cavanagh
By *[signature]*
Attorneys.

Nov. 22, 1938.                J. F. CAVANAGH                2,137,642
                        FASTENER-APPLYING IMPLEMENT
                           Filed May 24, 1937          4 Sheets—Sheet 4

Inventor:
John F. Cavanagh
By *Pennington and White*
Attorneys.

Patented Nov. 22, 1938

2,137,642

UNITED STATES PATENT OFFICE 2,137,642

FASTENER-APPLYING IMPLEMENT

John F. Cavanagh, Providence, R. I., assignor to Boston Wire Stitcher Company, Warwick, R. I., a corporation of Maine Application May 24, 1937, Serial No. 144,406

18 Claims. (Cl. 1—49)

This invention relates to improvements in fastener-applying implements and more particularly to portable implements for driving staples or other types of fasteners in attaching tags or labels to packing cases, drawings, advertising matter or the like to boards, tacking matting, carpets or the like to floors and walls, and for other similar purposes.

One object of the invention is to provide an implement of the type indicated which may be held and manipulated in one hand to apply the fasteners to the work.

Another object of the invention is to provide an implement of the type indicated having a spring adapted to be manually compressed while the driver is held inoperative and releasable to actuate the driver with considerable force.

Another object of the invention is to provide an implement of the type indicated having a latch automatically operative to hold the driver inoperative and manually-operative means for compressing the spring and releasing the latch in sequential order to actuate the driver.

Another object of the invention is to provide an implement of the type indicated which operates efficiently to effectively apply the fasteners, and one in which the means for compressing the spring has a maximum mechanical advantage to facilitate manual actuation.

Further objects of the invention are set forth in the following specification which describes a preferred form of construction of the invention, by way of example only, as illustrated by the accompanying drawings. In the drawings:

Fig. 3 is a front elevational view of the implement shown partly in section to illustrate the relationship of the magazine and fastener-applying means;

Fig. 4 is a side elevational view of the implement showing it with one of the casing sections removed to illustrate the relationship of the parts when the staple-driver is raised;

Fig. 5 is a longitudinal sectional view on line 5—5 of Fig. 4 showing the actuating arm for compressing the operating spring and releasing the driver;

Fig. 6 is a view similar to Fig. 4 showing the operating spring compressed and the bunter on the actuating arm about to rock the latch to release the staple-driver;

Fig. 8 is a transverse sectional view on line 8—8 of Fig. 6 showing the same relationship of the parts;

Fig. 9 is a transverse sectional view on line 9—9 of Fig. 6 showing the construction of the magazine and casing sections;

Fig. 10 is a transverse sectional view on line 10—10 of Fig. 6 showing the follower for compressing the operating spring and its link connection to the manually-operative means;

Fig. 11 is a transverse sectional view on line 11—11 of Fig. 1 showing one of the pivots for mounting the actuating handle on the casing;

The present invention relates generally to a portable hand tool having fastener-applying mechanism and operating means therefor enclosed in a hollow casing. The fastener-applying mechanism includes a reciprocable drive movable across the end of a magazine to drive fasteners fed thereto. The driver is actuated by the expansive force of a compression spring and is held in raised inoperative position by a pivoted latch while the spring is being compressed. Manually-operative means on the casing are arranged to compress the spring and include a bunter operative during its last increment of movement to actuate the latch to release the driver.

Figures 1, 2:
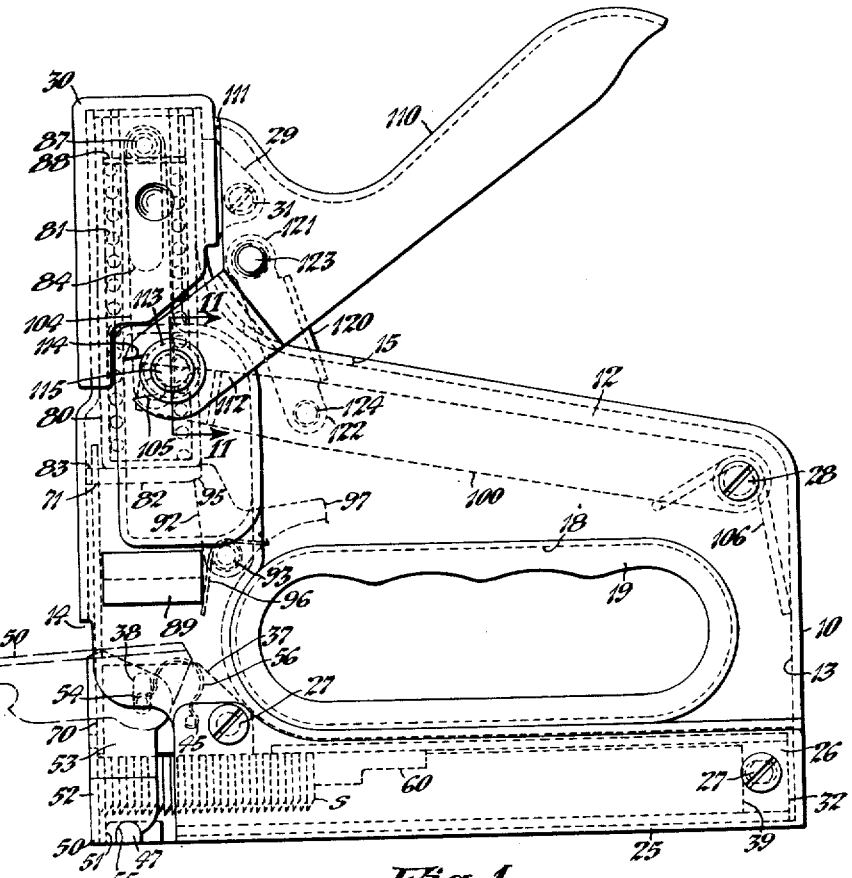
Fig. 1 is a side elevational view of a fastener-applying implement embodying the novel features of the present invention.
Fig. 2 is a top plan view of the implement showing the casing as partly broken away to illustrate the guideway for slidably mounting the driver-actuating plunger.

Referring to the drawings, the implement as herein illustrated comprises a hollow casing 10, preferably made in two separate sections 11 and 12 of identical form but of opposite hand, see Figs. 1 and 5; the separate parts being stamped from sheet-metal or die-cast of a suitable light material. The separate parts 11 and 12 have web-like side walls with inwardly-directed marginal flanges 13 arranged with their edges abutting at the rear, top and throughout a substantial part of the front to position the walls in spaced relation, see Fig. 6. At the lower end of the front of the casing 10 the side walls are cut away to provide an opening 14, shown in Fig. 6, and a smaller opening 15, shown in Fig. 8, is formed in the flanges 13 at the top of the casing for a purpose as will later appear. As shown most clearly in Figs. 2 and 6, the web-like sides of the casing sections 11 and 12 are shaped at their forward upper portions to provide a rectangular guideway 16 with recessed grooves 17 at the opposite sides. Alining openings 18 located substantially centrally of the sections 11 and 12 provide for the insertion of the fingers therethrough to adapt the implement to be held in one hand. Preferably, an insert 19 of soft rubber or other suitable material is mounted in the openings 18 to provide a cushion for the fingers and, as illustrated in Figs. 6 and 9, the insert has grooves 20 which engage the edges of the casing sections 11 and 12 around the openings 18.

As clearly illustrated in Fig. 9, the sections 11 and 12 of the casing 10 are mounted in a channel-shaped member 25 having a flat base and opposite side flanges 26 which embrace the outer sides of the casing. The bottom wall of the member 25 extends from the rear of the casing 10 to a point adjacent its forward end to close the bottom of the casing, see Fig. 6. As illustrated in Figs. 8 and 9, the sections 11 and 12 of the casing 10 are held in assembled relationship in the channel-shaped member 25 by studs 27 extending through the side flanges 26 and the side walls of the casing. The studs 27 are herein illustrated in the form of bolts with nuts at one end, but they may take other forms and be secured in place by any suitable means such as by welding or riveting. A similar stud 28 extends through the sections 11 and 12 of the casing 10 above and at the rear of the openings 18. As illustrated in the present drawings, a cap or sheath 30, preferably of heavy construction, is mounted on the forward part of the casing 10 to increase the weight and inertia of the implement. The rearward wall of the cap 30 is split longitudinally and provided with ears 29 clamped together by a bolt 31 to secure the cap in place.

A magazine for the fasteners is mounted in the casing 10, being herein illustrated as adapted to hold a supply of U-shaped staples s, but it is to be understood that other forms of fasteners may be used in the implement. The magazine 32 comprises a channel-shaped member, preferably constructed from sheet-metal with a bottom wall 33, upstanding sides 34 and flanges 35 folded inwardly therefrom to extend partly across the open top of the member, see Fig. 9. The magazine 32 is adapted to rest on the base of the member 25 and its sides 34 are pierced with alining holes 36 through which the retaining studs 27 extend to fasten it in place. At its forward end, see Fig. 8, the magazine 32 has stanchions 37 projecting upwardly from the flanges 35 and extending forwardly beyond the ends of the bottom and side walls 33 and 34. Each of the stanchions 37 has a vertically-extending slot 38, shown in Fig. 6, for a purpose to be later explained. Rails 39 are rigidly fixed to the bottom wall 33 of the magazine 32 with their upper edges positioned beneath the flanges 35 to provide a support or core for the staples s which are adapted to be straddled thereacross. The rails 39 are held in spaced relation by shouldered studs 40, see Figs. 6 and 8, and attached to the magazine 32 by lugs 41 bent inwardly from their lower edges and fastened to the bottom wall 33 by any suitable means such as rivets 42. As most clearly shown in Fig. 7, the forward ends 39' of the rails 39 extend beyond the ends of the side walls 34 and bottom wall 33 of the magazine 32 into the opening 14 formed in the casing section 10 to underlie the forwardly projecting stanchions 37, while the rearward ends of the rails terminate short of the rearward end of the magazine. The lower edges of the forwardly-extending ends of the rails 39 are offset or bent outwardly from the main plane to provide flanges 46 which have raised lugs 47 formed thereon, see Figs. 1 and 4. A trough-shaped shield 43, see Figs. 6 and 8, is mounted between the stanchions 37 above the forward end of the magazine 32 by means of pins 44 and 45 extending through the stanchions and the sides of the shield. The stanchions 37 are also provided with alined holes through which the retaining bolt 27 extends to rigidly hold the forward end of the magazine in position in the casing 10.

A door or gate 50 is pivotally mounted on the stanchions 37 for cooperation with the end of the rails 39 to form a throat 51 therebetween, see Figs. 4 and 6. The gate 50 is of U-shape in cross-section having a front wall 52 and opposite side walls 53 which project rearwardly to straddle the stanchions 37. The gate 50 is pivoted to the stanchions 37 by means of a pin 54 which projects through slots 38 therein with its ends connected to the sides 53 of the gate. At their lower ends the side walls 53 are cut away to form notches 55 for cooperation with the latching lugs 47 on the forwardly-projecting ends of the rails 39. The pin 54 mounts the gate 50 on the stanchions 37 to adapt it to be rocked from closed position, shown in full lines in Fig. 1, to open position indicated by dash lines and the relatively long slots 38 permit the gate to be moved vertically on the stanchion to engage its notches 55 with and release them from the laterally-projecting lugs 47. The gate 50 is yieldingly held in closed position by a bowed spring 56 having loops at either end, one of which embraces the pivot-pin 54 for the gate and the other the fixed pin 45 extending between the stanchions 37.

The staples s are advanced along the magazine 32 to feed them successively into the throat 51 by means of a staple-pusher 60 of inverted U-shape which rides on the rails 39 at the rear of the staples. The staple-pusher 60 is urged forwardly by an elastic element such as a helical spring 61 or the like having one end attached to a lug 62 on the pusher. The spring 61 extends forwardly around the forward spacer stud 40 and then rearwardly of the magazine 32 with its opposite end attached to a lug 63 struck up from the bottom 33 of the magazine. A cross-pin 64 seated in slots 65 in the rearward ends of the rails 39 has its ends projecting laterally across the spaces between the sides of the rails and the sides plates 34, and these laterally-projecting ends of the pin are adapted to be engaged by the rearward edges of the sides of the pusher 60 to limit its rearward movement. The pin 64 is resiliently held in the slot 65 by a spring 66 stretched between the pin and the rearward spacer stud 40. The ends of the studs 40 terminate at the outer faces of the rails 39 so as not to obstruct the pusher during its sliding movement in the magazine, see Fig. 8.

A staple-driver 70 is mounted to reciprocate in the throat 51 at the forward end of the magazine 32 to drive staples advanced along the rails 39. The staple-driver 70 has a transverse slot 71 adjacent its upper end for connection with its operating means and its lower end is guided by the ends of the rails 39 and the front and side walls 52 and 53 of the gate 50. A staple-retainer or pawl 72 of usual construction is pivotally mounted on the pin 44 and has a forward abutment 74 which is engaged by the rearward face of the driver 70 when the gate 50 is closed to hold the pawl 72 in inoperative position. A spring 75 is coiled about the pin 44 with one end engaging the pivot-pin 54 and its other end engaging the abutment 74, thereby tending to rock the pawl 72 into engagement with the staples when the gate 50 is opened and the driver 70 released.

Figure 7:
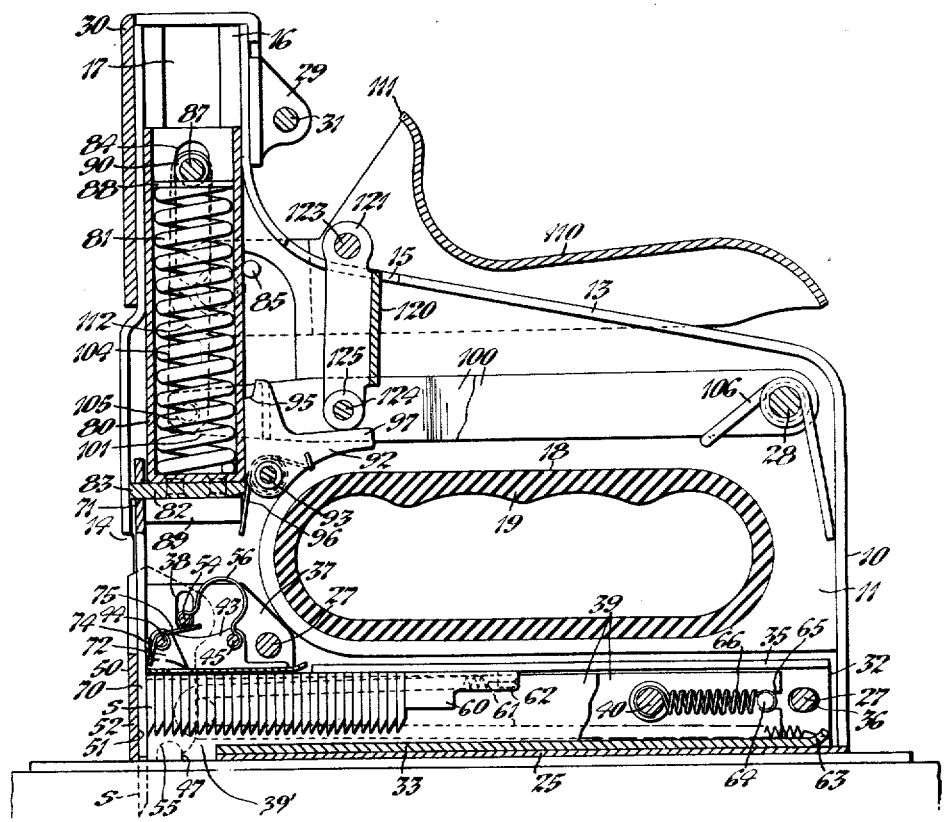
Fig. 7 is a view similar to Figs. 4 and 6 showing the relationship of the parts at the end of a staple-driving operation.

The operating means constituting the subject-matter of the present invention include a plunger 80 connected to actuate the driver 70 and operated by the expansive force of a compression spring 81. As most clearly shown in Figs. 5 and 6, the plunger 80 is of hollow rectangular form slidably mounted in the guideway 16 in the casing 10. The plunger 80 is further guided by a cross-pin 85 extending between the sides of the sections 11 and 12 of the casing 10. A plate 82 rigidly secured to the bottom of the plunger 80 in any suitable manner, as by welding, riveting or the like, has a forwardly-extending tongue 83 which projects through the slot 71 in the upper end of the driver 70. The spring 81 is mounted in the hollow plunger 80 with its lower end seated on its bottom and its upper end engaged by a follower such as a cross-pin 87. As herein illustrated, the cross-pin 87 engages a plate 88 overlying the upper end of the spring and has reduced ends projecting outwardly through slots 84 in the opposite sides of the plunger 80 and into the grooves 17 in the guideway 16. The slots 84 extend downward from a point adjacent the upper end of the plunger 80 to permit the follower-pin 87 to be moved longitudinally thereof to compress the spring 81. Preferably the pin 87 has bosses 90 at its ends which are slidable in the slots, see Fig. 10. The downward stroke of the plunger 80 is limited by the engagement of the bottom plate 82 with fixed abutments 89 projecting inwardly from the side walls of the casing 10. As illustrated in Figs. 7 and 8, the abutments 89 are formed by members having right-angular legs 89ª and 89ᵇ with the legs 89ª of each member extending inwardly through suitable apertures in the sides of the casing and the other legs 89ᵇ overlying the sides of the casing and fixedly secured thereto in any suitable manner such as by soldering, welding or the like, see Fig. 3.

Figure 12:
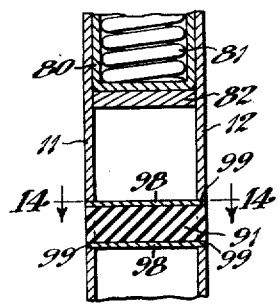
Fig. 12 is a transverse sectional view through the plunger and casing showing a modified form of the implement provided with a yielding abutment engageable by the plunger at the end of its driving stroke.
Figure 13:
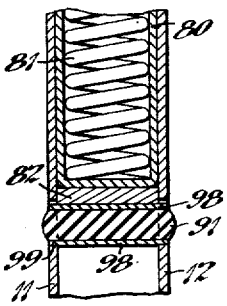
Fig. 13 is a view similar to Fig. 12 showing the abutment engaged by the plunger and yielding to reduce the shock.
Figure 14:
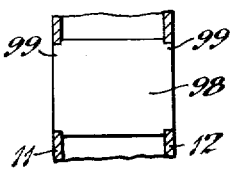
Fig. 14 is a sectional view on line 14—14 of Fig. 12 showing the means for retaining the abutment in position in the casing.

A preferred construction of abutment is illustrated in Figs. 12 to 14 which is adapted to yield slightly when struck by the plunger to reduce the shock. The abutment is comprised of a rubber block 91 supported between upper and lower plates 98 of identical construction. The plates 98 have their corners notched to form tongues 99 of reduced width which project outwardly through suitable apertures in the opposite side walls of the opposed sections 11 and 12 of the casing 10. The tongues 99 are so proportioned as to provide a close fit with the sides of the apertures in the casing sections 11 and 12 and the shoulders at the rear of the tongues cooperate with the inside faces of the walls of the casing sections to hold the plates against displacement.

The plunger 80 is releasably held in its raised position by a latch or trigger 92 pivotally mounted on a cross-pin 93 extending between the sides of the sections 11 and 12 of the casing 10. As illustrated in Figs. 6 and 8, the latch 92 is in the form of a bell-crank lever having laterally-extending hubs 94 through which the pivot-pin 93 extends to hold the latch centered in the casing. One of the arms of the bell-crank lever or latch 92 bears against the rearward side of the plunger 80 and is formed with a notch 95 at its end for engaging the bottom and rearward edges of the plate 82. The pivoted latch 92 is rocked forwardly under the action of a spring 96 to engage the notch 95 with the plunger 80. The spring 96 is coiled about one of the hubs 94 of the latch 92 and has one end hooked around the latch with its opposite end bearing against the abutment 89. The opposite arm 97 of the latch 92 extends rearwardly and is adapted to be engaged by the operating means as later described to rock the latch and thereby release the plunger 80.

The operating means for compressing the spring 81 and actuating the latch 92 include a rockable arm 100 extending longitudinally throughout substantially the entire length of the casing 10. The arm 100 is pivotally mounted on the stud 28 at its rearward end and is bifurcated at its forward end to form laterally-spaced ears 101, see Fig. 5, which straddle the plunger 80 adjacent its lower end. As herein illustrated the arm 100 is comprised of two parts rigidly connected throughout a considerable portion of their length, as by riveting, welding or the like, and having their ends oppositely stepped to form the spaced ears 101 forwardly of its forked sides 102.

The arm 100 is connected to the follower-pin 87 by opposite links 104 positioned in the grooves 17 at the opposite sides of the guideway 16. The links 104 are pivoted to the ears 101 on the arm 100 by means of pins 105 with their opposite ends pivotally connected to the ends of the cross-pin 87 to form an articulated structure which translates the rocking movement of the arm into a vertical straight-line motion. The arm 100 is rocked about the pivot-stud 28 to raise the plunger 80 under the tension of a hairpin spring 106 having its looped end bearing against the bottom of the arm with its legs straddling the latter and coiled about the stud and then extended to bear against the flanges 13 at the rear of the casing 10.

The arm 100 is actuated against the tension of the spring 106 by a manually-operative lever 110 pivoted at its forward end to the casing 10 at 115 and extending rearwardly to overlie the top of the casing. The lever 110 is curved to conform to the configuration of the hand and has a forwardly-projecting lip 111 for engaging the side of the cap 30 to limit its upward movement. As illustrated in Fig. 1, the lever 110 has forwardly-projecting ears 112 which straddle the sides of the casing 10 and are apertured to form circular bearings 113 with slots 114 extending outwardly to the edge of the ears. The lever 110 is pivotally mounted on studs 115 riveted or otherwise secured to the sides of the casing sections 11 and 12 and projecting outwardly therefrom into the circular bearings 113, see Fig. 11. Removable bushings 116 mounted on the studs 15 fit tightly within the circular bearings 113, being held in place by spring-rings 117 sprung into annular grooves 118 in the studs adjacent their outer ends. The lever 110 is mounted on the studs 115 by sliding it forwardly relatively of the casing 10 to cause the studs to enter the circular bearings 113 through the slots 114. The bushings 116 are then placed on the studs 115 and fastened in place with the rings 117 to retain the lever 110 in position on the studs.

The lever 110 and arm 100 thus constitute compound levers, being connected by means of a link 120 extending through the opening 15 in the flanges 13 of the casing 10. The link 120 is positioned intermediate the ends of the lever 110 and arm 100 so that the movement transmitted through the lever and arm is decreased and the power applied to the follower-pin 87 to compress the spring 81 is increased to impart a mechanical advantage to the operating means. As shown in Figs. 5 and 6, the link 120 is formed of a single piece of sheet-metal folded to channel shape to provide spaced sides which are extended and apertured to provide ears 121 and 122 at its opposite ends. The upper end of the link is pivoted to the lever 110 by a stud or pin 123 extending through the sides of the lever and the ears 121, while the ears 122 at the lower end of the link lie between the spaced rails 102 of the arm 100 and are pivoted thereto by a pin 124 extending through the rails and ears. A bunter in the form of a collar 125 is mounted on the pin 124 between the ears 122 and overlies the arm 97 of the latch 92. The device having now been described in detail its method of operation will be next explained.

The implement is prepared for operation by loading the magazine with a supply of staples s. For this purpose the gate 50 is lifted against the action of the bowed spring 56, to release its notches 55 from engagement with the latching lugs 47, and then rocked on the pivot-pin 54 to the position indicated by dash lines in Fig. 1. As the gate 50 is moved away from the end of the magazine the staple-retainer 72 is released and rocked by the spring 75 to engage and hold any staples which may be contained in the magazine to prevent them from being ejected therefrom. The staples s are preferably united in the form of a refill stick which is pushed into the magazine 32 to overlie the spaced rails 39 forming the staple-core. The staples will thus slide the pusher 60 rearwardly on the core against the tension of the spring 61. The rearward movement of the staple-pusher 60 is limited by the engagement of the rearward edges of its sides with the laterally-projecting ends of the pin 64 which provides a yielding abutment due to the spring 66. The yielding resistance caused by the engagement of the pusher 60 with the pin 64 thus gives an indication as to when the magazine is fully loaded. That is to say, as a stick of staples is pushed into the magazine the pusher 60 is slid rearwardly until it contacts the pin 64. Then, the operator will be appraised of the fact that the magazine is nearly filled, but the spring 66 will yield to permit a few more staples to be entered into the magazine. As the staples are pushed into the magazine the staple-retainer 72 is rocked to permit them to slide thereunder, but when the staples are released it immediately engages therewith to prevent them from being ejected from the magazine by the force of the pusher 60.

After a supply of staples have been inserted into the magazine 32 the gate 50 is rocked back to its closed position in cooperative relation to the end of the spaced rails 39, being latched by the engagement of its notches 55 with the lugs 47. As the gate 50 is moved to closed position its forward wall 52 engages the abutment 74 on the staple-retainer 72 to rock the latter about the pivot-pin 44 to inoperative position. The staple-pusher 60 then acts to resiliently urge the staples forwardly in the magazine to deliver them successively beneath the driver 70. The sides 53 of the gate 50 engage the offset laterally-projecting flanges 48 at the bottom of the staple-core to aline the gate with its sides in spaced relation to the rails 39 whereby to provide a clearance for the legs of the staples. The gate 50 is yieldingly held in latched engagement with the lugs 47 by the bowed spring 56.

While held in one hand the implement is placed on the work to position its forward end at the point where it is desired to apply a staple s. The plunger 80 is normally raised to its uppermost position, illustrated in Fig. 1, by the spring 106 which rocks the arm 100 connected to the plunger by the links 104 and follower-pin 87. The plunger 80 is held in this raised position by the engagement of the notched end 95 of the latch 92 with the edge of the plate 82. To apply a fastener the manually-operative lever 110 is depressed by the pressure of the fingers of the hand in which the implement is held to cause it to be rocked downwardly about the pivot-studs 115. The rocking movement of the lever 110 is transmitted through the link 120 to rock the arm 100 downwardly about its pivot 28. This motion of the arm 100 is transmitted through the links 104 to the follower-pin 87 which causes the latter to slide the plate 88 downwardly within the plunger 80 to compress the spring 81 as illustrated in Fig. 6. During the final increment of movement of the lever 110 about its pivot 28 the bunter 125 on the lever 100 engages the arm 97 of the trigger or latch 92 and rocks the latter about its pivot 93 against the tension of the spring 96. The latch 92 is thus released from the plunger 80, see Figs. 6 and 7, and the expansive force of the compressed spring 81, acting between the plate 88 as a stationary abutment and the bottom of the plunger, causes the plunger and driver 70 connected thereto to descend with considerable force through a driving stroke. The end of the driver 70 impinges against the top of the foremost staple s, separates it from the other staples in the magazine and drives it through the throat 51 into the work, in the manner as illustrated in Fig. 7. The driving stroke of the plunger 80 is limited by the engagement of the plate 82 with the abutments 89 to prevent the end of the driver 70 from moving beyond the throat 51 and mutilating or otherwise damaging the work. When a resilient abutment of the type illustrated in Figs. 12 to 14 is used the rubber block 91 is compressed between the plates 88, see Fig. 13, to yieldingly arrest the movement of the plunger at the end of its stroke to reduce the shock and resultant wear and tear on the parts. During the driving stroke the plunger 80 slides along the side of the latch 52 as illustrated in Fig. 7.

After the completion of a staple-driving operation the manually-operative lever 110 is released and the spring 106, acting between the casing 10 and the arm 100, causes the latter to be rocked to its inoperative position illustrated in Fig. 1. As the arm 100 is rocked upwardly the follower-pin 87 engages the upper end of the slots 84 and slides the plunger 80 upwardly in the guideway 16. At the end of the upward movement of the plunger 80 the latch-member 92 is rocked by the spring 96 to automatically engage its notched end 95 with the plate 82 to hold the plunger in its raised position. The rocking movement of the arm 100 about its pivot 28 is also transmitted through the link 120 to the lever 110 to rock the latter about the pivot-studs 115. The upward movement of the arm 100 and other parts connected thereto is limited by the engagement of the lever 110 with the cap 30 at the rear of the guideway 16. The parts are thus automatically returned to their initial position with the plunger 80 held by the latch 92. The implement is then ready for another staple-driving operation identical with that previously described, another staple s having been advanced by the pusher 60 into the throat 51.

It will be observed from the foregoing that the invention provides a simple and compact portable hand tool which is adapted to drive fasteners with considerable force by means of a loaded or compressed spring. It will be noted that the implement provides for storing energy during a comparatively long stroke of the operating handle or lever 110 with little resistance and then releases the energy instantaneously to drive the staple with a quick action. It will also be observed that the staple-driver is held in raised position during the compression of the spring to permit the staples to be advanced thereunder and the driver is released during the last increment of movement of the manually-operative means which provides for efficient operation to effectively drive the fasteners with little or no appreciable wear on the parts.

While the invention is herein shown as embodied in a preferred form of construction it is to be understood that various modifications may be made in the structure and arrangement of the parts of the device without departing from the spirit or scope of the invention. For instance, mechanical springs may be substituted for the rubber block in the resilient abutment engageable by the plunger or the abutment may be in the form of a laminated leaf-spring, and other structural changes may be made in the various elements as will be apparent to one skilled in the art. Therefore, without limiting myself in this respect, I claim:

1. In a device of the type indicated, fastener-applying means including a reciprocable driver, a spring for actuating the driver, means operatively connected to the driver for holding the latter in inoperative position, means independent of the last-named means and movable relatively of the driver to compress the spring, and a pivoted lever for actuating the movable means, said pivoted lever actuating the holding means after the spring is compressed whereby to release the driver.

2. In a device of the type indicated, fastener-applying means including a reciprocable driver, a spring connected to actuate the driver, means operatively connected to the driver for holding the latter in raised position, means independent of the last-named means and movable relatively of the driver for compressing the spring and actuating the holding means to release the driver after the spring is compressed, and a pivoted lever for actuating the movable means with a mechanical advantage, said spring actuating the driver to apply the fasteners to the work.

3. In a device of the type indicated, fastener-applying means including a reciprocable driver, a spring connected to actuate the driver, latch-means operatively connected to the driver for holding the latter inoperative, and manually-operable means independent of the latch-means comprising compound levers movable relatively of the driver and arranged to compress the spring and actuate the latch-means at the end of said movement to release the driver, said spring actuating the driver with a quick action to apply the fasteners to the work.

4. In a device of the type indicated, fastener-applying means including a reciprocable driver, means connected to the driver and operative to raise the latter, a pivoted latch automatically operative to engage the second-named means to hold the driver in raised position, a spring connected to actuate the driver, and a pivoted lever movable relatively of the driver while the latter is held by the latch to compress the spring and thereafter rock the latch whereby to release the driver.

5. In a device of the type indicated, fastener-applying means including a reciprocable driver, a hollow plunger connected to the driver, a coiled spring in the plunger, a latch for holding the plunger in raised position, and a manually-operable lever arranged to compress the spring and thereafter actuate the latch to release the plunger, said spring actuating the plunger and driver to apply the fasteners to the work.

6. In a device of the type indicated, the combination of fastener-applying mechanism including a reciprocable driver, and operating means for the driver comprising a hollow plunger connected thereto, a spring in the plunger, a latch for holding the plunger in raised position, an arm pivoted at one end with its opposite end movable with respect to the plunger and arranged to compress the spring, and means on the arm for actuating the latch to release the plunger after the spring has been compressed.

7. In a device of the type indicated, fastener-applying mechanism including a reciprocable driver, and operating means for the driver comprising a hollow plunger connected thereto, a spring in the hollow plunger, a latch for holding the plunger, an arm pivoted at one end with its free end movable relatively of the plunger, means at the free end of the arm for compressing the spring as the arm is rocked about its pivot, means on the arm for actuating the latch to release the plunger after the spring is compressed, and a manually-operated lever connected to actuate the arm.

8. In a fastener-applying device, a magazine for fasteners, a driver movable across the end of the magazine, latch-means operatively connected to the driver for holding the latter raised to permit fasteners to be advanced along the magazine to position them beneath the driver, a compression spring for actuating the driver, and manually-operative means independent of the latch-means and comprising compound levers movable relatively of the driver for successively compressing the spring and actuating the latch to release the driver.

9. In a fastener-applying implement, a magazine for holding a supply of fasteners, a pivoted gate cooperating with the forward end of the magazine to form a throat through which the fasteners are driven as they are advanced along the magazine, said gate being movable away from the end of the magazine to supply fasteners thereto, a reciprocable driver in said throat for applying the fasteners to the work, a latch for holding the driver in raised position, a spring for actuating the driver, and means movable relatively of the driver for successively compressing the spring while the driver is held by the latch and thereafter actuating the latch to release the driver.

10. In a device of the type indicated, a hollow casing, a magazine in the casing for holding a supply of fasteners, a driver movable across the end of the magazine to apply fasteners advanced therealong, a spring in the casing connected to operate the driver, a latch for holding the driver in raised position, a pivoted arm for compressing the spring and actuating the latch after the spring has been compressed, and a lever on the casing connected to actuate the pivoted arm.

11. In a device of the type indicated, a hollow casing having opposed sections formed to provide a rectangular guideway, said casing sections having openings therein forming a handgrip, a magazine in the casing for holding a supply of fasteners, a driver movable across the end of the magazine to apply fasteners fed thereto from the magazine, a hollow plunger slidable in the rectangular guideway of the casing and connected to operate the driver, a spring in the plunger, a latch for holding the plunger in raised position, and manually-operative means including a lever for compressing the spring, said lever pivoted to the casing and overlying the handgrip and said manually-operative means actuating the latch after the spring is compressed to release the plunger.

12. In a device of the type indicated, a hollow casing, a magazine in the casing for holding a supply of fasteners, a driver movable across the end of the magazine to apply the fasteners fed from the magazine, a plunger connected to operate the driver, a spring in the plunger, a latch for engaging and holding the plunger in raised position, compound lever mechanism for compressing the spring and actuating the latch to release the plunger, and a stop in the casing below the plunger for limiting the stroke of the driver.

13. In a device of the type indicated, the combination of fastener-applying mechanism including a reciprocable driver, and means connected to operate the driver comprising a hollow plunger having slots in its opposite sides, a spring in the plunger, a follower overlying the spring and projecting through the slots in the sides of the plunger, means for raising the plunger, a latch for holding the plunger in raised position, and manually-operative means connected to the follower and movable relatively of the plunger to compress the spring, said manually-operative means actuating the latch to release the plunger after the spring is compressed.

14. In a device of the type indicated, a hollow casing, a magazine in the casing for holding a supply of fasteners, a driver movable across the end of the magazine to apply the fasteners fed from the magazine, a hollow plunger connected to the driver and having slots at its opposite sides, a spring in the plunger, a pin overlying the spring and projecting through the slots in the plunger, a bifurcated arm pivoted at one end with its opposite end straddling the plunger, links connecting the ends of the cross-pin with the bifurcations of the arm, a spring for rocking the arm to raise the plunger, a latch for engaging the plunger to hold it in raised position, a manually-operated lever overlying the casing, and a link connecting the manually-operated lever to actuate the arm.

15. In a device of the type indicated, fastener-applying means including a driver, a plunger connected to actuate the driver, a spring for actuating the plunger, latching means for holding the plunger and driver inoperative, manually-operable means comprising compound levers for compressing the spring while the plunger is held inoperative, and means operated by said manually-operable means to release the latch after the spring has been compressed.

16. In a device of the type indicated, fastener-applying means including a driver, a plunger connected to operate the driver, a spring for actuating the plunger, latching means for holding the plunger and driver inoperative, means for compressing the spring while the plunger and driver are held inoperative, and a lever for operating said last-named means and releasing the latching means after the spring has been compressed.

17. In a device of the type indicated, fastener-applying means including a reciprocable plunger, a spring for actuating said plunger, means for compressing the spring and releasing the plunger to cause the spring to actuate the plunger through a driving stroke, and a yielding abutment engageable by said plunger at the end of its driving stroke comprising a block of resilient material having metal facings at its opposite sides.

18. In a device of the type indicated, a hollow casing having apertures in its opposite sides, fastener-applying means in said casing including a reciprocable plunger, a spring for actuating the plunger, means for compressing the spring and releasing the plunger to cause the spring to actuate the plunger through a driving stroke, and a resilient abutment engaged by the plunger at the end of its stroke comprising spaced plates having tongues extending outwardly through the apertures in the casing and a rubber block between the plates.

JOHN F. CAVANAGH.

DISCLAIMER 2,137,642.—*John F. Cavanagh*, Providence, R. I. FASTENER-APPLYING IMPLEMENT. Patent dated November 22, 1938. Disclaimer filed November 28, 1939, by the assignee, *Boston Wire Stitcher Company;* the inventor, consenting.

Hereby enters this disclaimer to claims 5, 9, 15, and 16 in said specification.

[*Official Gazette December 26, 1939.*]

end of the magazine to apply fasteners advanced therealong, a spring in the casing connected to operate the driver, a latch for holding the driver in raised position, a pivoted arm for compressing the spring and actuating the latch after the spring has been compressed, and a lever on the casing connected to actuate the pivoted arm.

11. In a device of the type indicated, a hollow casing having opposed sections formed to provide a rectangular guideway, said casing sections having openings therein forming a handgrip, a magazine in the casing for holding a supply of fasteners, a driver movable across the end of the magazine to apply fasteners fed thereto from the magazine, a hollow plunger slidable in the rectangular guideway of the casing and connected to operate the driver, a spring in the plunger, a latch for holding the plunger in raised position, and manually-operative means including a lever for compressing the spring, said lever pivoted to the casing and overlying the handgrip and said manually-operative means actuating the latch after the spring is compressed to release the plunger.

12. In a device of the type indicated, a hollow casing, a magazine in the casing for holding a supply of fasteners, a driver movable across the end of the magazine to apply the fasteners fed from the magazine, a plunger connected to operate the driver, a spring in the plunger, a latch for engaging and holding the plunger in raised position, compound lever mechanism for compressing the spring and actuating the latch to release the plunger, and a stop in the casing below the plunger for limiting the stroke of the driver.

13. In a device of the type indicated, the combination of fastener-applying mechanism including a reciprocable driver, and means connected to operate the driver comprising a hollow plunger having slots in its opposite sides, a spring in the plunger, a follower overlying the spring and projecting through the slots in the sides of the plunger, means for raising the plunger, a latch for holding the plunger in raised position, and manually-operative means connected to the follower and movable relatively of the plunger to compress the spring, said manually-operative means actuating the latch to release the plunger after the spring is compressed.

14. In a device of the type indicated, a hollow casing, a magazine in the casing for holding a supply of fasteners, a driver movable across the end of the magazine to apply the fasteners fed from the magazine, a hollow plunger connected to the driver and having slots at its opposite sides, a spring in the plunger, a pin overlying the spring and projecting through the slots in the plunger, a bifurcated arm pivoted at one end with its opposite end straddling the plunger, links connecting the ends of the cross-pin with the bifurcations of the arm, a spring for rocking the arm to raise the plunger, a latch for engaging the plunger to hold it in raised position, a manually-operated lever overlying the casing, and a link connecting the manually-operated lever to actuate the arm.

15. In a device of the type indicated, fastener-applying means including a driver, a plunger connected to actuate the driver, a spring for actuating the plunger, latching means for holding the plunger and driver inoperative, manually-operable means comprising compound levers for compressing the spring while the plunger is held inoperative, and means operated by said manually-operable means to release the latch after the spring has been compressed.

16. In a device of the type indicated, fastener-applying means including a driver, a plunger connected to operate the driver, a spring for actuating the plunger, latching means for holding the plunger and driver inoperative, means for compressing the spring while the plunger and driver are held inoperative, and a lever for operating said last-named means and releasing the latching means after the spring has been compressed.

17. In a device of the type indicated, fastener-applying means including a reciprocable plunger, a spring for actuating said plunger, means for compressing the spring and releasing the plunger to cause the spring to actuate the plunger through a driving stroke, and a yielding abutment engageable by said plunger at the end of its driving stroke comprising a block of resilient material having metal facings at its opposite sides.

18. In a device of the type indicated, a hollow casing having apertures in its opposite sides, fastener-applying means in said casing including a reciprocable plunger, a spring for actuating the plunger, means for compressing the spring and releasing the plunger to cause the spring to actuate the plunger through a driving stroke, and a resilient abutment engaged by the plunger at the end of its stroke comprising spaced plates having tongues extending outwardly through the apertures in the casing and a rubber block between the plates.

JOHN F. CAVANAGH.

DISCLAIMER 2,137,642.—*John F. Cavanagh*, Providence, R. I. FASTENER-APPLYING IMPLEMENT. Patent dated November 22, 1938. Disclaimer filed November 28, 1939, by the assignee, *Boston Wire Stitcher Company;* the inventor, consenting.
Hereby enters this disclaimer to claims 5, 9, 15, and 16 in said specification.
[*Official Gazette December 26, 1939.*]